Feb. 14, 1967 J. R. MILES 3,304,365

SCANNING APPARATUS WITH DYNAMIC FOCUSING

Filed Jan. 9, 1964 2 Sheets-Sheet 1

INVENTOR.
JOHN R. MILES
BY Hermann C. Schuler
Stanley Z. Cole
ATTORNEY

Feb. 14, 1967 J. R. MILES 3,304,365

SCANNING APPARATUS WITH DYNAMIC FOCUSING

Filed Jan. 9, 1964 2 Sheets-Sheet 2

INVENTOR.
JOHN R. MILES

BY [signature]
[signature]
ATTORNEY

United States Patent Office 3,304,365

Patented Feb. 14, 1967

3,304,365

SCANNING APPARATUS WITH DYNAMIC FOCUSING

John R. Miles, Glenview, Ill., assignor to Xerox Corporation, Rochester, N.Y., a corporation of New York Filed Jan. 9, 1964, Ser. No. 336,798
3 Claims. (Cl. 178—7.6)

This invention relates to scanning devices for facsimile communication systems and, more particularly, to a scanning device of the type which successively directs a "flying spot" across a surface being scanned as the surface is continuously moved.

In conventional scanning apparatus, such as a cathode ray tube, which employs a generator of a "flying light spot," the inherent disadvantage is the relatively low level of brightness that is available for the spot produced by the apparatus. In addition, in scanning documents or other light receiving surfaces which are placed on a flat platen and advanced to intercept the light rays from the scanning apparatus, the "flying light spot" usually is brightest at one point on the document, usually at the center of scan, and is diminished somewhat for the beginning and ending points of the scan. This undesirable phenomenon is apparent since the optical path length for the light rays of the relatively small "flying light spot" is greatest at the edge portions of the document.

Some attempts to obviate these problems have resulted in the use of a curved platen for presenting the document in the field of scan. These devices are seriously limited as to the forms of document which can be accommodated by the platen. For example, it is not possible to scan documents on such forms as stiff cardboard, magazines, or books.

In the present invention, the scanning device is of the type employing a scanning head having a plurality of projection lens tubes which are spaced at equal angles radically about an axis of rotation of the scanning head and a light source having its light rays focused on the document. As the scanning head is rotated, each of the lens tubes successively intercepts the light rays to cause scanning of the document from edge to edge, one complete scan for each traverse of a lens tube. A pair of reflective surfaces are interposed between the light source and the lens tubes and are arranged to serially intercept the light rays. Means are provided for varying the positions of these reflective surfaces in order to shorten or lengthen the optical distance between the light source and the lens tube during scanning by each lens tube in order to maintain in focus the spot produced by the light source.

The principal object of the present invention is to automatically compensate for the variations in the optical path length during circular scanning by a "flying light spot" of a flat object.

Another object of the invention is to insure that all points of an object being scanned will be uniformly illuminated during successive scans by a mechanical scanner.

Figure 1:
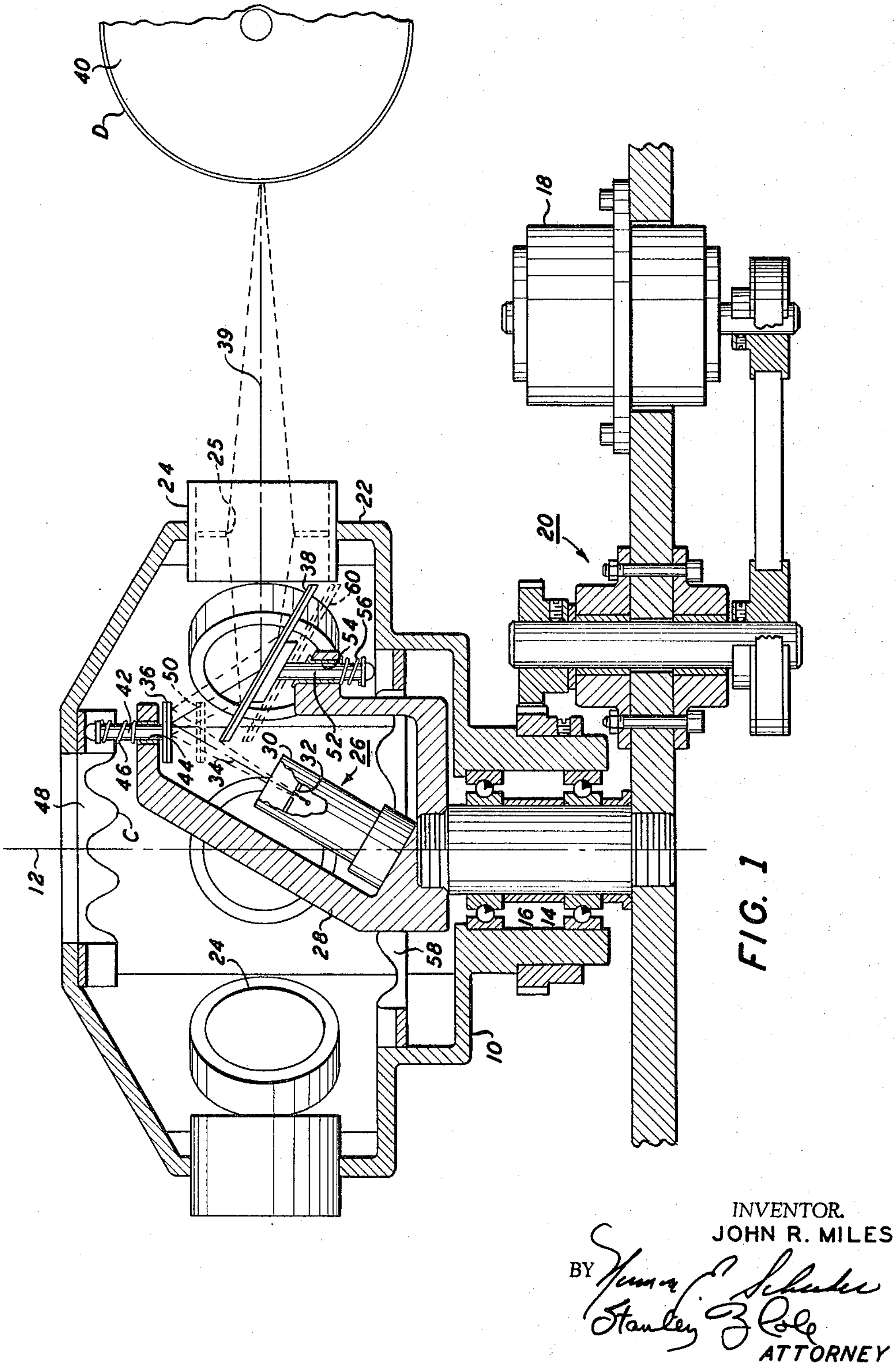
Figure 2:
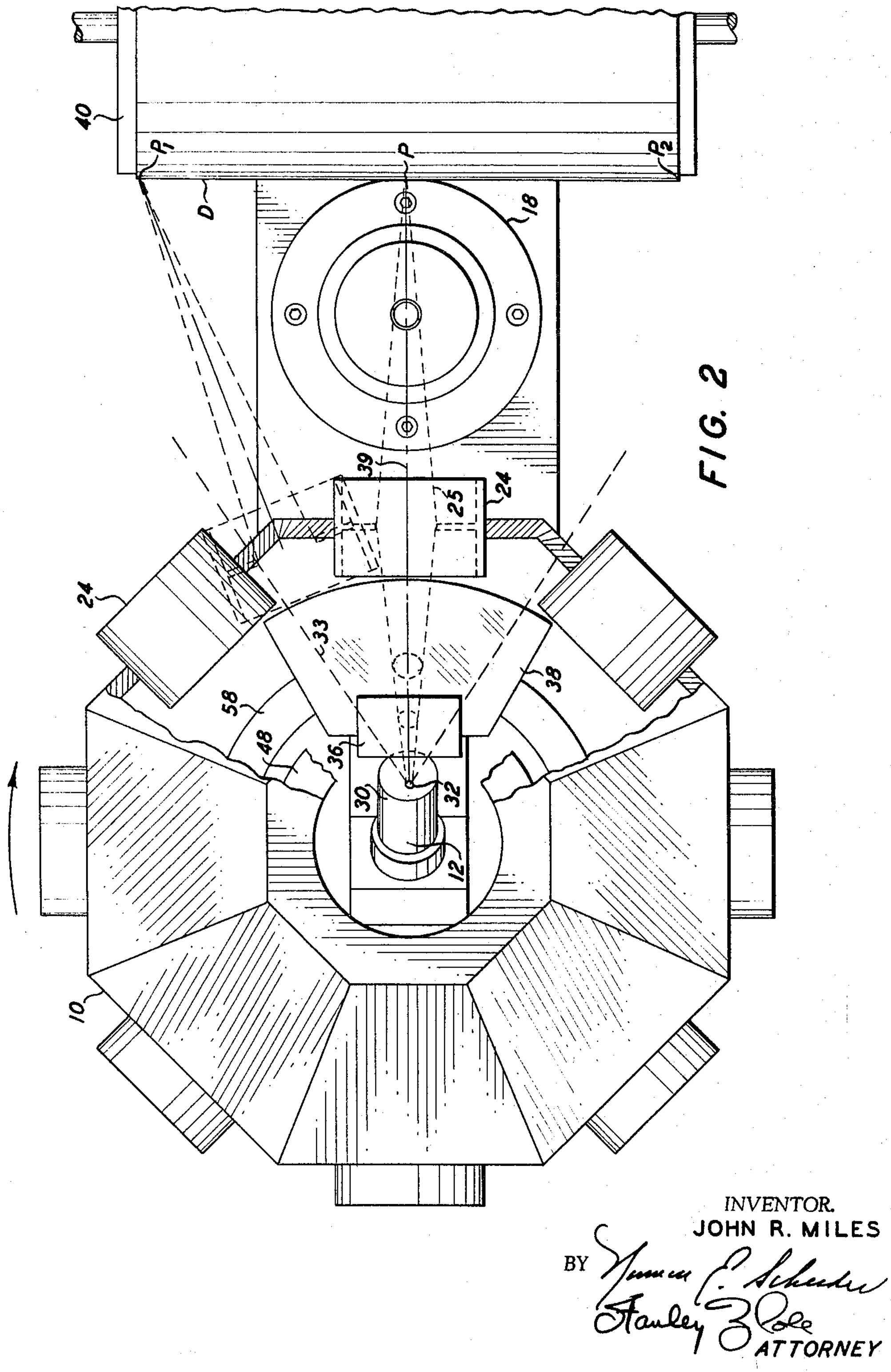

Other objects and features of the invention will become apparent in the following description when taken in conjunction with the accompanying drawings wherein:

FIG. 1 is a side elevational view in section showing the arrangement of the parts of the present invention; and FIG. 2 is a plan view partly in section of the present invention.

Referring more particularly to FIG. 1 of the drawings, there is shown a scanner head 10 adapted for rotation about a vertical axis 12 and mounted on a fixed spindle 14 by means of thrust bearings 16. A suitable electric motor 18 is utilized to rotate the scanner head 10 and, for this purpose, a drive mechanism 20, which may include a belt drive, is provided to impart rotation to the head 10 by the motor 18.

The scanner head 10 is generally circular in form and is provided with a circumferential wall 22 which rotates about the axis of rotation 12 during rotation of the scanner head. Mounted in suitable apertures formed in the wall 22 are a plurality of projection lens tubes 24 which are equidistant from the axis 12 and are spaced relative to one another by equal angles. Each of the lens tubes may include one or more optical lens elements combined to form a suitable projection lens system and an aperture 25.

As shown in FIG. 1, there are eight lens tubes and these are angularly spaced from one another through an angle of 45°. Each of the lens tubes 24 is adapted to receive light rays from a light source 26 mounted in a fixed frame 28 which, in turn, is mounted on the fixed spindle 14. The light source 26 comprises a cylinder 30 having a suitable lamp positioned intermediate the ends thereof and an aperture 32 at the upper end for effecting a pin point source of light with diverging light rays. The lamp and aperture are adapted to produce a diverging beam of light 33, as shown in FIG. 2, which eventually terminates into a "flying light spot" that is directed upon an object being scanned. The center ray or the optical axis of the diverging beam of light for the portion thereof between the source 26 and the lens tube is indicated by the reference numeral 34 and is the object distance for the scanner optical system. As shown in FIG. 1, the axis 34 extends through the axis of rotation 12.

The cylinder 30 for the light source is arranged on the frame 28 such that the optical axis 34 is inclined at a fixed angle from the axis of rotation 12. The light rays emanating from the light source are intercepted by a first mirror 36 which is disposed in a horizontal plane and slidably mounted on the frame 28. The light rays reflected from the mirror 36 are directed to a second mirror 38 disposed in a plane which is adapted to receive most of the light rays from the mirror 36. The mirror 38 is slidably mounted on the frame 28 in a manner that is similar to the mounting of the mirror 36, which mounting will be described hereinafter. The light rays reflected from the mirror 38 are directed through a lens tube 24 and along the optical axis 39 for projection upon a support drum 40 upon which a document D may be secured for scanning purposes.

For facsimile transmission of intelligence presented on the document, a suitable light collecting device, such as a photomultiplier, may be positioned adjacent the document and arranged to receive reflected light images of the intelligence being scanned by the light spot. Suitable electronic circuitry connected to the photomultiplier may be utilized for generating a video signal in accordance with the electrical signal produced by the photomultiplier. The present invention, while herein described in relation to the scanning of a document, may also be utilized as a printout mechanism. In this arrangement, the lamp in the light source 26 would be replaced by a source capable of being modulated by an electrical signal from a facsimile transmitter and the drum 40 would be provided with a photoreceptive surface, such as selenium, for use in a xerographic processing apparatus.

With the parts so far described as shown in FIG. 1, wherein a lens tube 24 is positioned such that it is in optical alignment with the light source 26 and the mirrors 36, 38, the light source is adapted to produce divergent light rays which are intercepted by the lens tube to be focused as a light spot at the center point P of the document. As the scanner head 10 rotates to impart circular movement to the lens tube 24, the light spot will move along a straight line from the central point P to the edge of the document illustrated at point $P_2$. This will be apparent since the lens tube 24 will receive light rays incident thereon and produce a cone of converging light rays which will be deflected in accordance with movement of the lens tube. Normally, if the mirrors 36 and 38 are fixed relative to the light source, the light spot will progressively become out of focus as the light spot moves from point P to point $P_2$. This out of focus condition will be caused by the increase in the image distance or the axis 39 between the lens tube and the document D as the light spot moves away from point P toward point $P_2$. In order to compensate for this condition, the present invention utilizes means for varying the distance between the light source and the lens tube, or the object distance or the axis 34 as each of the lens tubes 24 is rotated between the points of scan.

Each of the lens tubes 24 is adapted to project the light spot that is reflected from the mirror 38 upon the document D along a straight line between point $P_1$ to point $P_2$, which line, for purposes of scanning, is in effect a flat object surface, the succeeding lens tube will commence projection of the light spot starting at point $P_1$ at the same time that the preceding lens tube has completed its scan. In this manner, as the scanner head continuously rotates about the axis 12, each of the lens tubes 24 in turn will intercept the light beam axis 34 and thereby successively project the light spot across the document. Since there are eight lens tubes illustrated, the angle of movement along an arc having its center on the axis 12 and through which each of the lens tubes is effective to project the light spot from the light source 26 is approximately 45°. From this, it will be apparent that for every complete revolution of the scanner head 10, there will be eight complete scans of the document D by the light spot and that if the drum 40 is successively rotated, the document will be scanned in its entirety.

The angle of divergence for the cone of light from the light source 26 has been set for the optical object distance between the light source 26 and the lens tube so that a lens tube will be adapted to focus the resulting light spot at central point P. Assuming that the positions of the mirrors 36 and 38 are fixed, it will be apparent that when a lens tube commences scanning at point $P_1$ the light spot will be out of focus. As the light source moves from point $P_1$ to the central point P, the light spot gradually becomes focused until it reaches point P whereat it is in focus. In moving from point P to point $P_2$, the light spot would again become out of focus.

During rotation of the scanner head 10, both mirrors 36 and 38 will reciprocate in such a manner that the optical distance from the light source 26 to the lens tube is varied in accordance with the variation in the image distance between the lens tube and the document to maintain the light spot in constant focus as it is moved from point $P_1$ through to point $P_2$. To this end the mirror 36 is carried by a plunger 42 which is mounted for reciprocation along a vertical line through an aperture 44 formed in the frame 28. A coil spring 46, held in compression between the frame 28 and lock washer secured to the upper end of the plunger 42, normally maintains the mirror 36 in its uppermost position, as shown in solid lines in FIG. 1. A circular cam 48, having its center of curvature on the axis of rotation 12, is formed on an interior surface of the head 10 to be rotatable therewith. The plunger 42 is continually held in engagement with the cam by the spring 46 and reacts with the shape of the cam surface for moving the plunger along its axis.

The cam 48 is sinusoidal in configuration and as the scanner head rotates about the axis 12, the plunger 42 will accordingly reciprocate vertically relative to the frame 28. As shown in FIG. 1, the plunger 42 is at its uppermost position relative to the cam 48, which position is indicative of the projection of the light spot upon point P. As the scanner head 10 rotates from the position shown in FIG. 1, in a direction indicated by the arrow, the plunger will gradually be forced downwardly against the tension of the spring 46. When the cam approaches its highest point, indicated at C, which is indicative of the position of the scanner head when a lens tube is projecting the light spot upon point $P_2$, the mirror 36 will be moved to the position indicated by the dotted line 50. Continued rotation of the scanner head will present a cam surface of sinusoidal form for the plunger 42 to follow. The plunger will correspondingly reciprocate sinusoidally between the extreme positions shown in FIG. 1. In scanning from points $P_1$ to $P_2$, the mirror 36 will have travelled from one of its lowest positions to one of its highest positions and back to another of its lowest positions, or to have made a complete sine wave cycle of movement. Since there are eight scanning lens tubes for a single revolution of the head 10, the cam surface 48 will be formed in accordance with eight complete sine wave cycles.

The mirror 38 is mounted on a plunger 52 which is slidably received in an aperture 54 formed in the frame 28. A coil spring 56 is held in compression between the frame 28 and a suitable lock washer secured to the lower end of the plunger for normally holding the mirror in a lowermost position. The lower end of the plunger 52 is adapted to slide on and follow the contour of a circular cam 58 formed on a lower internal surface of the scanner head 10. The cam 58 is similar to cam 48 and has a camming surface which is sinusoidal in form in order to impart sinusoidal reciprocation to the plunger 52 to thereby impart corresponding movement of the mirror 38.

The periods for the sinusoidal waveforms of the cams 48 and 58 are exactly equal but are positioned 180° out of phase relative to one another and the amplitude of the sine wave cam 58 is slightly less than that for the sine wave cam 48. To illustrate, it will be noted in FIG. 1 that the plunger 52 is positioned at its highest point relative to the cam 58 while the plunger 42 is at its lowest point relative to the cam 48. Upon rotation of the scanner head 10, the mirror 38 will be moved axially from the position indicated in solid lines to the dotted line position indicated by the numeral 60. The purpose of the mirror 38 is to direct the reflected light rays from the mirror 36 to the optical axis of a lens tube 24 and to maintain this condition for all positions of the mirror 36. In other words, when the mirror 36 is in the position indicated at 50, which condition would cause the reflected light therefrom to fall upon the mirror 38 at an angle such that light rays reflected from the mirror 38 would be directed through a lens tube in a line parallel to but offset from the optical axis thereof, the mirror 38 will correspondingly be forced downwardly to redirect the reflected light rays through and in alignment with the optical axis of the lens tube.

In operation, a document D or other object to be scanned is attached to the drum 40, which may be suitably connected to a slow constant speed drive motor (not illustrated). The scanner head is also rotated at a constant speed which may be of such a magnitude relative to the speed of the drum that there will be one scan of the light spot for every incremental movement of the document, say, for example, a distance equal to the diameter of the light spot. As a lens tube 24 arrives at a position to intercept the light rays emanating from the light source 26 and reflected from the mirrors 36 and 38, the light spot will be projected upon the document at point $P_1$. In this position of the parts, the mirrors 36 and 38 will be in their lowermost positions and the light spot at point $P_1$ will be in focus. As the scanner head is rotated and as the light spot is moved towards point P, the mirrors 36 and 38 will move progressively upwardly toward their uppermost positions. Throughout this travel wherein the image distance becomes shorter, the light spot, in moving from point $P_1$ to point P, will remain in focus since the object distance between the light source and the lens tube is being shortened at a rate corresponding to the rate that the image distance is being shortened. When the lens tube has reached a position wherein the light spot is at point P, the mirrors 36 and 38 will be in their uppermost position. Continued rotation of the scanner head will move the light spot from point P to point $P_2$ and this action will cause the mirrors 36 and 38 to move toward their lowermost position until the light spot reaches point $P_2$ whereupon the mirrors will be at their lowermost positions. In traveling from point P to point $P_2$, the light spot will remain in focus since the gradual downward movement of the mirror 36 will increase the object distance at a rate equal to the rate the image distance between the lens tube and the light spot on the document is increasing in order to maintain the light spot in constant focus.

From the foregoing description, it will be seen that the present invention automaticaly compensates for the variations in the optical path length during scanning by a flying light spot of an object being scanned. While the invention has been described herein as embodied in a specific apparatus selected for purposes of illustration, it is not desired to be limited thereby, but it is intended to cover the invention broadly within the scope of the appended claims.

What is claimed is:

1. A scanning device for scanning a flat object surface with a light spot comprising:

a rotary scanner head, means for rotating the head about an axis of rotation, a fixed light source arranged within said head and adapted to direct the light rays emanating from the light source along an optical path, a plurality of lens tubes having projection lens elements mounted on said scanner head at equal angularly spaced positions about the axis of rotation of the head and arranged to successively intercept the light rays from the light source during rotation of said head, at least one mirror surface mounted within said scanner head and being arranged to intercept the light rays and to direct the rays through each of the lens tubes, and means for cyclically positioning said mirror surface during scanning by each lens tube in order to vary the optical distance between the light source and each of the lens tubes during each scan and thereby maintain the light spot in focus.

2. An apparatus for optically scanning an object surface which for each individual scan approximates a straight line comprising:

a rotary scanner head having a fixed light source adapted to produce divergent light rays, a light spot on the surface being scanned along an optical path, a plurality of lens tubes having projection lens elements mounted on said scanner head at equal angularly spaced positions about an axis of rotation of the head, means for rotating the head about said axis for moving said lens tubes in a circular path the plane of which is coincident with the plane of the line on the object surface being scanned, a mirror surface mounted within said scanner head and being arranged to intercept the light rays emanating from said source and to direct the rays successively through each of the lens tubes, each of said lens tubes being adapted to receive light rays from said mirror surface and to converge the rays to form a light spot on the object surface, and means for cyclically positioning said mirror surface as the lens tubes traverse the surface being scanned in order to vary the length of the optical path between the light source and each lens tube during each scan and thereby maintain the light spot focus.

3. A scanning device for scanning a flat object surface with a light spot comprising:

a member adapted for rotation about an axis of rotation, a plurality of lens tubes mounted on said member at equal angularly spaced positions about the axis of rotation of the member and arranged to successively traverse the object surface during rotation of said member, a light source arranged to project diverging light rays radially from said axis of rotation successively through each of said lens tubes during rotation of said member, a mirror surface arranged between the light source and the lens tubes for intercepting the light rays emanating from said source and directing the same to the said tubes, each of said lens tubes being adapted to receive light rays from said mirror surface and to converge the rays to form a light spot on the object surface, and means for cyclically positioning said mirror surface as the lens tubes traverse the object surface in order to vary the optical distance between the source and the lens tubes during each scan and thereby maintain the light spot in focus.

References Cited by the Examiner

UNITED STATES PATENTS 2,262,584 11/1941 Herriott ------------ 178—7.6

3,222,453 12/1965 Whitesell -------- 178—7.1 XR

DAVID G. REDINBAUGH, *Primary Examiner.*

R. L. RICHARDSON, P. SPERBER, *Assistant Examiners.*